Figure 1:
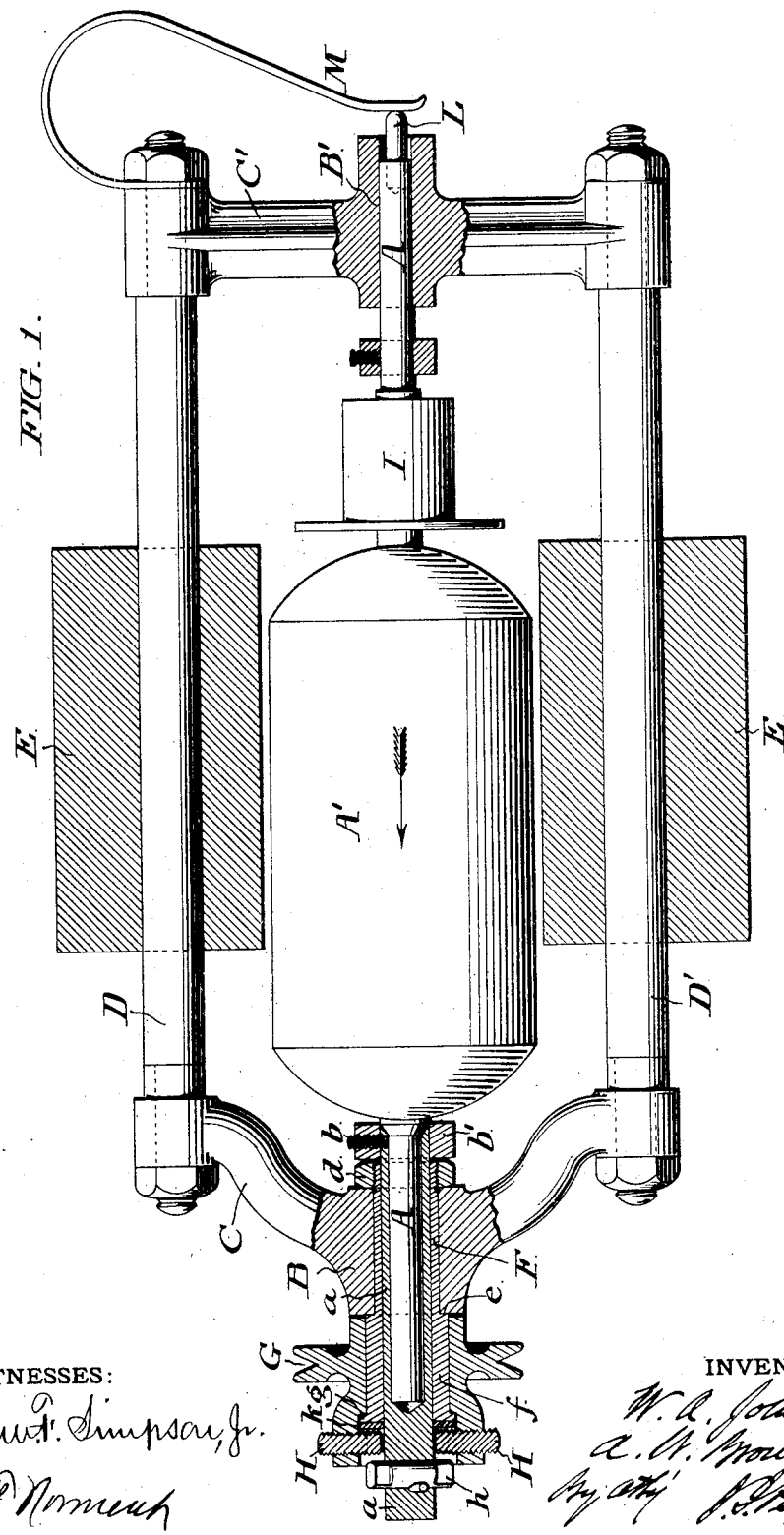

(No Model.) 2 Sheets—Sheet 1.

W. A. JOHNSTON & A. W. BROWNE.
CLUTCH FOR ELECTRIC MOTORS.

No. 503,420. Patented Aug. 15, 1893.

WITNESSES:
Edw. F. Simpson, Jr.

INVENTORS
W. A. Johnston
A. W. Browne
by atty

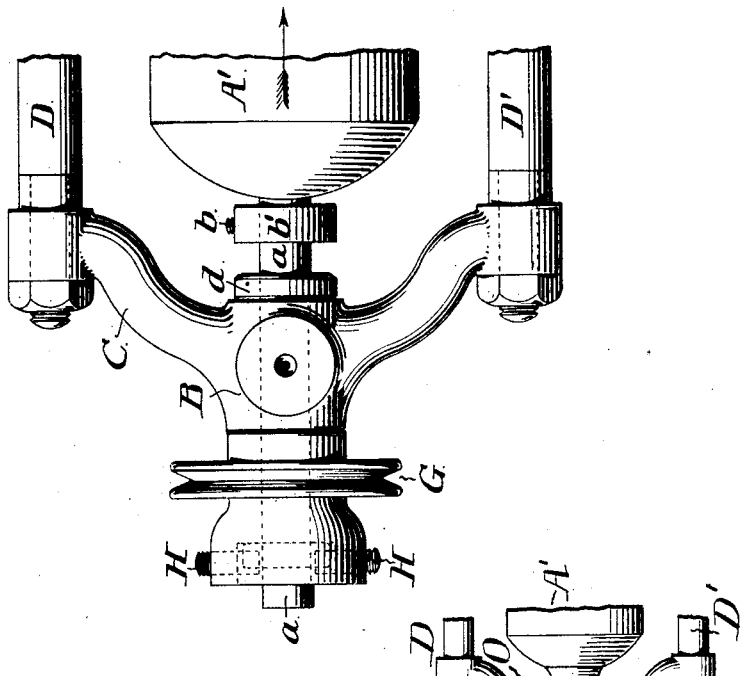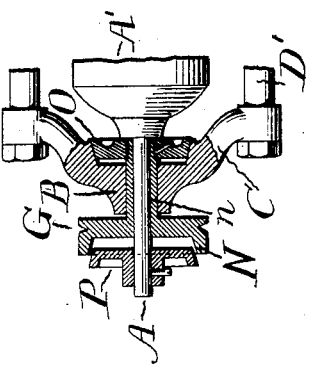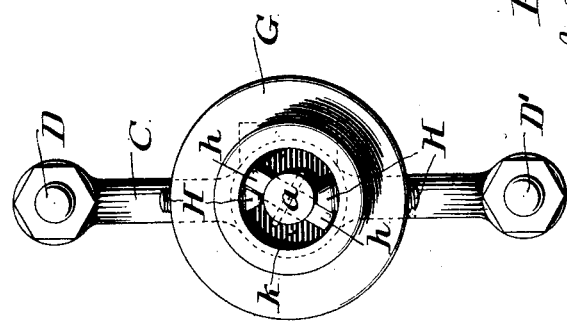

UNITED STATES PATENT OFFICE.

WILLIAM A. JOHNSTON AND ARTHUR W. BROWNE, OF PRINCE'S BAY, NEW YORK, ASSIGNORS TO THE S. S. WHITE DENTAL MANUFACTURING COMPANY, OF PHILADELPHIA, PENNSYLVANIA.

CLUTCH FOR ELECTRIC MOTORS.

SPECIFICATION forming part of Letters Patent No. 503,420, dated August 15, 1893.

Application filed March 3, 1893. Serial No. 464,514. (No model.)

*To all whom it may concern:*

Be it known that we, WILLIAM A. JOHNSTON and ARTHUR W. BROWNE, of Prince's Bay, in the county of Richmond and State of New York, have invented certain new and useful Improvements in Clutches for Electric Motors, of which the following is a specification.

Our invention relates to certain improvements, hereinafter specifically claimed, in means for actuating clutches for stopping and starting motion from the armature shafts of electric motors.

In the accompanying drawings, which indicate all features of an electric motor the illustration of which is required to show a suitable embodiment of our invention, Figure 1 is a view partly in plan and partly in horizontal section. Fig. 2 is a plan view. Fig. 3 is an end view showing the clutch end of the armature shaft and adjacent parts. Fig. 4 is a view on a reduced scale, partly in plan and partly in horizontal section, showing a modification.

The shaft A of a suitable armature A' of an electric motor is mounted to rotate, and also to slide endwise to a limited extent, in proper bearings B B' at its front and rear ends, which are respectively provided in cross bars or yokes C, C' connecting the opposite ends of the frame rods D D' upon which the poles E E of the field are mounted. The armature shaft is mounted in its front bearing B in the following way: A sleeve $a$ is secured to the shaft by a clamp screw $b$ which passes through a collar $b'$ which serves to limit forward movement of the armature. A bushing sleeve F surrounds the shaft sleeve $a$ and has a nut $d$ screwed upon its inner end and bearing against the frame yoke C. A shoulder $e$ at the inner termination of an enlarged portion $f$ of the bushing sleeve bears against the frame yoke C. Adjustment of the clamp nut $d$ prevents turning of the bushing sleeve F. This bushing sleeve terminates at its outer end in an annular shoulder $g$. A pulley G is mounted by its hub to rotate freely on the enlarged portion $f$ of the bushing sleeve and is prevented from endwise movement by the yoke frame and the annular shoulder $g$. A clutch pin $h$ is keyed to the shaft sleeve $a$ at its front end, and an enlarged projecting portion of the pulley hub is provided with clutch pins H H, screwed in place so as to be readily detachable, which interlock with the clutch pin of the armature shaft when this shaft is moved inward. A cushion washer $k$ seated against the outer end of the bushing sleeve F lessens shock upon inward movement of the armature.

Between the armature commutator I and the rear bearing for the armature shaft is provided a fixed collar upon the shaft to limit inward movement of the armature by contact with the frame yoke C'. A detachable wearing plug L is fitted in a socket at the rear end of the armature shaft to be acted upon by the free end of a spring M which is suitably secured at its opposite end to the motor frame. This plug when worn may be replaced by another, and wear of the armature shaft by contact with the spring is thus avoided. It will be seen that the spring presses forward the armature shaft so that normally it is out of clutch with the pulley, as represented by Fig. 1. When the field poles are excited the armature is drawn backward toward the center of the magnetic field, and the pulley is thus instantly clutched with the rotating armature shaft. When the circuit is broken in any suitable well known way, the pulley is unclutched by the action of the spring upon the armature shaft.

Instead of the clutch connections consisting of the pins H H, $h$, there may be substituted equivalent clutch connections, such for instance as shown in Fig. 4, which represents the pulley G as formed with a recessed face provided with an inclined annular flange N and a sleeve $n$ projecting through the bearing B around the shaft A. A disk O secured to the inner end of the pulley sleeve and having an inclined periphery is adapted to engage a conical recess in the frame yoke C, into which it is wedged by the spring M when allowed to perform its function. In this way rotation of the pulley may quickly be arrested. A clutch disk P fast on the shaft A and having an inclined periphery is wedged into the recessed face of the pulley when the field is electrically excited, and the pulley is thus caused to rotate, as will readily be understood.

We claim as our invention—

The combination of the endwise movable armature, the pulley, the sleeve surrounding the armature shaft at one end and upon which the pulley is mounted, the clutch connections between the armature shaft and the pulley, the spring secured to the motor frame and acting upon the armature shaft to move it forward and unclutch it from the pulley, and the field pole pieces which when excited draw backward the armature and its shaft to cause engagement of said shaft with the pulley by the clutch connections, substantially as set forth.

In testimony whereof we have hereunto subscribed our names.

WILLIAM A. JOHNSTON.
ARTHUR W. BROWNE.

Witnesses:
SEYMOUR CASE,
IRVING DECKER.